US009788553B2

(12) United States Patent
Dodd et al.

(10) Patent No.: US 9,788,553 B2
(45) Date of Patent: Oct. 17, 2017

(54) DOUBLE-CRUSTED PIZZA PRODUCTS, AND METHODS FOR PRODUCING SAME

(75) Inventors: Kristin N. Dodd, Milwaukee, WI (US); Steven P. Greiner, Mundelein, IL (US); Bernard William Conway, III, Appleton, WI (US); Rachel Yost, Chicago, IL (US); Lisa A. Foster, Park City, IL (US); Patricia Stockwell, Green Bay, WI (US)

(73) Assignee: Nestec S.A., Vevey (CH)

( * ) Notice: Subject to any disclaimer, the term of this patent is extended or adjusted under 35 U.S.C. 154(b) by 1098 days.

(21) Appl. No.: 12/609,638

(22) Filed: Oct. 30, 2009

(65) Prior Publication Data

US 2011/0104339 A1     May 5, 2011

(51) Int. Cl.
| *A21D 13/00* | (2017.01) |
| *A21D 13/32* | (2017.01) |
| *A21D 13/41* | (2017.01) |

(52) U.S. Cl.
CPC ............ *A21D 13/32* (2017.01); *A21D 13/41* (2017.01)

(58) Field of Classification Search
CPC ...... A23L 1/0067; A23L 1/1606; A23L 1/007; A21D 13/007; A21D 13/0003; A21D 13/0045
USPC .................................................. 426/94, 303
See application file for complete search history.

(56) References Cited

U.S. PATENT DOCUMENTS

| 4,283,431 A | 8/1981 | Giordano et al. |
| 4,285,979 A | 8/1981 | Izzi |
| 4,774,095 A | 9/1988 | Kleinschmidt et al. |
| 2003/0209194 A1* | 11/2003 | Amigh et al. .................. 118/24 |
| 2004/0213883 A1 | 10/2004 | Sadek et al. |

(Continued)

FOREIGN PATENT DOCUMENTS

| CA | 2241577 | 12/1999 |
| CA | 2241577 A1 * | 12/1999 |

(Continued)

OTHER PUBLICATIONS

Lehmann, T. Pressed, Sheeted, or Hand-Tossed. 2002. Pizza Marketing Quarterly. ProDoughUSA.com. [Online]. Available at: <URL: http://www.prodoughusa.com/doughforming.html>.*

(Continued)

*Primary Examiner* — Katherine D Leblanc

(74) *Attorney, Agent, or Firm* — K&L Gates LLP

(57) ABSTRACT

Compositions and methods for double-crusted pizza product and method for making are disclosed having a peripheral gap extending around, or substantially around, the product perimeter between upper and lower crusts forming a gap. One embodiment provides a double-crusted layer pizza product having a lower crust layer forming a base; an upper crust layer positioned above the lower crust layer; a sauce layer applied directly adjacent to the upper crust layer on a lower surface thereof and positioned between the lower and upper crust layers; at least one ingredient; and the sauce layer having a water concentration of at least 40 percent weight. A second sauce layer or oil layer can be optionally applied adjacent to an upper surface of the lower crust layer. Cut-outs of the second crust layer can occur prior to or after hot-pressing a billet. Optional methods can include spraying the second sauce layer.

13 Claims, 2 Drawing Sheets

(56) References Cited

U.S. PATENT DOCUMENTS

2007/0082091 A1    4/2007    Klavon et al.
2008/0063755 A1*   3/2008    Gan et al. .................. 426/95

FOREIGN PATENT DOCUMENTS

| EP | 0334586 | 9/1989 |
|----|---------|--------|
| EP | 1219174 | 7/2002 |
| GB | 2390525 | 1/2004 |
| WO | 9725870 | 7/1997 |
| WO | 0221927 | 3/2002 |
| WO | 03051128 | 6/2003 |

OTHER PUBLICATIONS

"White Sauce" USDA Food Database. Apr. 29, 2014 http://ndb.nal.usda.gov/ndb/foods/show/1280.*
L. Shen, "Pastry," Qingdao Publishing House, 1st edition, Jun. 2008, pp. 87-91.
D. Stalker "Sandwiches" Compiled by S.I. Litvinenko, 1999, p. 317 (1 page).
Russian Office Action 2012122178 dated May 29, 2014, 9 pages.

* cited by examiner

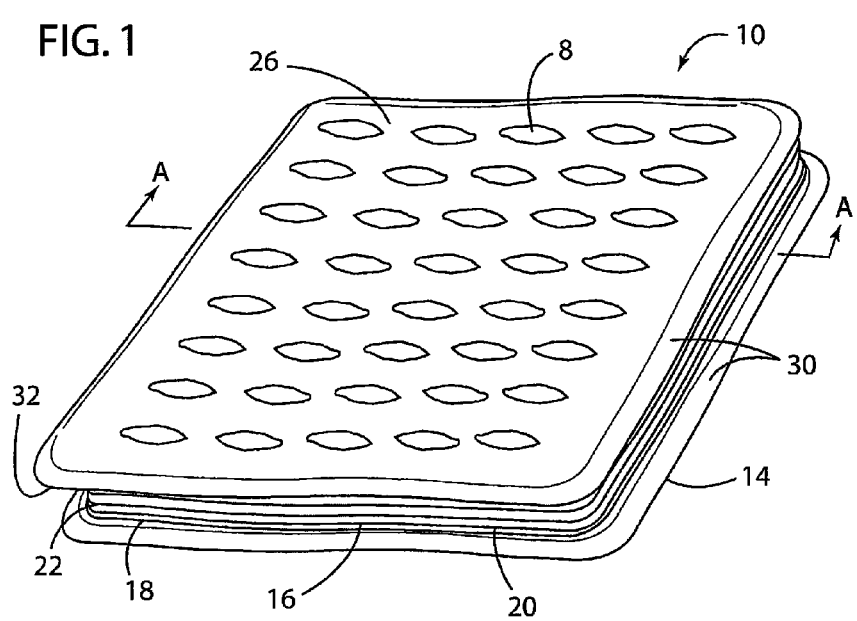
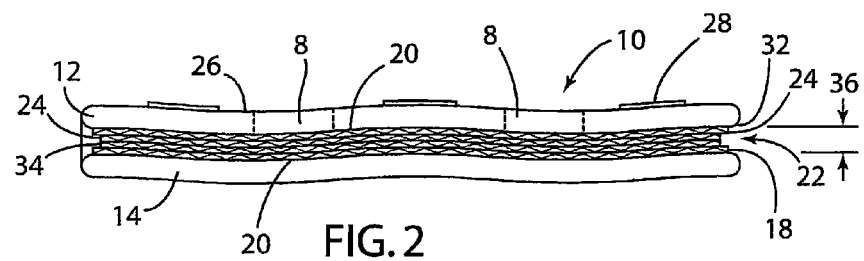

DOUBLE-CRUSTED PIZZA PRODUCTS, AND METHODS FOR PRODUCING SAME

FIELD

The present products and methods relate to pizza products, and more specifically, to double-crusted pizza products and methods for producing same.

BACKGROUND

Pizza products generally include a crust layer topped with a sauce layer, a cheese layer, and often any assortment of other exposed ingredients generally described as 'toppings'. Other pizza products can also include a second upper crust layer. Examples of these double-crusted pizzas can include calzones, Stromboli and stuffed pizza products.

Known double-crusted pizza products join the peripheral edge of the overlapping crusts to form a continuous crust (pocket) structure to secure the upper crust to the remainder of the pizza and to maintain the ingredients within the pocket.

It is desirable though, in some instances, for consumers to view the ingredients within a double-crusted pizza product to, for example, determine ingredient type, quality and quantity without the need to read descriptions on product packaging. Attempts to achieve this, such as using a lattice arrangement of openings on an upper crust, can pose design challenges. The lattice arrangement may appear to consumers to more closely resemble a pie crust than a pizza crust. Additionally, such openings only allow consumers to view the upper layer of ingredients. Consumers may also not be able to determine the quantity of ingredients just by viewing the upper surface. Finally, in some situations, openings in the upper crust may be undesirable for a multi-piece pizza product. For instance, if the pizza product is cut into several pieces, some pieces may have only a small amount of upper crust. Additionally, continuous crust (pocket) type products are often desirable to consumers to allow holding the product without touching the messier pizza ingredients, such as the meat, cheese and sauce.

SUMMARY

Accordingly, a double-crusted pizza product and a method for making same are disclosed. The present double-crusted pizza product has a peripheral gap extending around, or substantially around, the product perimeter between an upper and lower crust.

The peripheral gap provides visual access to consumers, thus enabling consumers to view the product ingredients, including ingredients located in various vertical layers. Consumers can thus better determine the freshness, quality and quantity of the ingredients. In addition, providing visual access at a peripheral gap, rather than through large openings on the upper crust enable consumers to grasp a piece of the product without needing to place their fingers on the messier ingredients, providing a cleaner eating experience.

One embodiment provides a double-crusted layer pizza product having a lower crust layer forming a base; an upper crust layer positioned above the lower crust layer, wherein a portion of peripheral edges of the lower and upper crust layers are spaced from one another defining a gap therebetween; a sauce layer applied directly adjacent to the upper crust layer on a lower surface thereof and positioned between the lower and upper crust layers; at least one ingredient; and the sauce layer having a water concentration of at least 40 percent weight. A second sauce layer or oil layer can be optionally applied adjacent to an upper surface of the lower crust layer.

Additional features of the product can include at least 20 percent of the peripheral edges of the first and second crust layers spaced from each other to define a gap therebetween. An average height of the gap can be up to about 24 mm. Cutouts on the upper crust can also be included.

Methods to manufacture the present products can include providing a lower crust layer to form a base of the pizza product; applying a first sauce layer on an upper portion of the first crust layer; distributing at least one first ingredient on the first sauce layer; applying a second sauce layer over the at least one first ingredient layer having a water concentration of at least 40 percent weight; providing a second crust layer above and adjacent to the second sauce layer so that at least a portion of a peripheral edge of the upper crust is spaced from an adjacent portion of a peripheral edge of the lower crust layer to define a gap therebetween.

The steps of providing the crust layers can include mixing, sheeting and cutting dough to form a billet; and hot pressing the billet at about 37 to 150 degrees Celsius, dwell for about 8 to 10 seconds, at a pressure of about 43 Kg/cm.

Cut-outs of the second crust layer can occur prior to or after the step of hot-pressing the billet. Optional methods can include spraying the second sauce layer.

Other features will become more apparent to persons having ordinary skill in the art to which the concentrate pertains and from the following description and claims.

BRIEF DESCRIPTION OF THE DRAWINGS

FIG. 1 is a perspective view of one exemplary double-crusted pizza product;

FIG. 2 is a side cross-sectional view of the double-crusted pizza product of FIG. 1 taken along line A—A;

DETAILED DESCRIPTION OF THE PREFERRED EMBODIMENT

Figure 3:
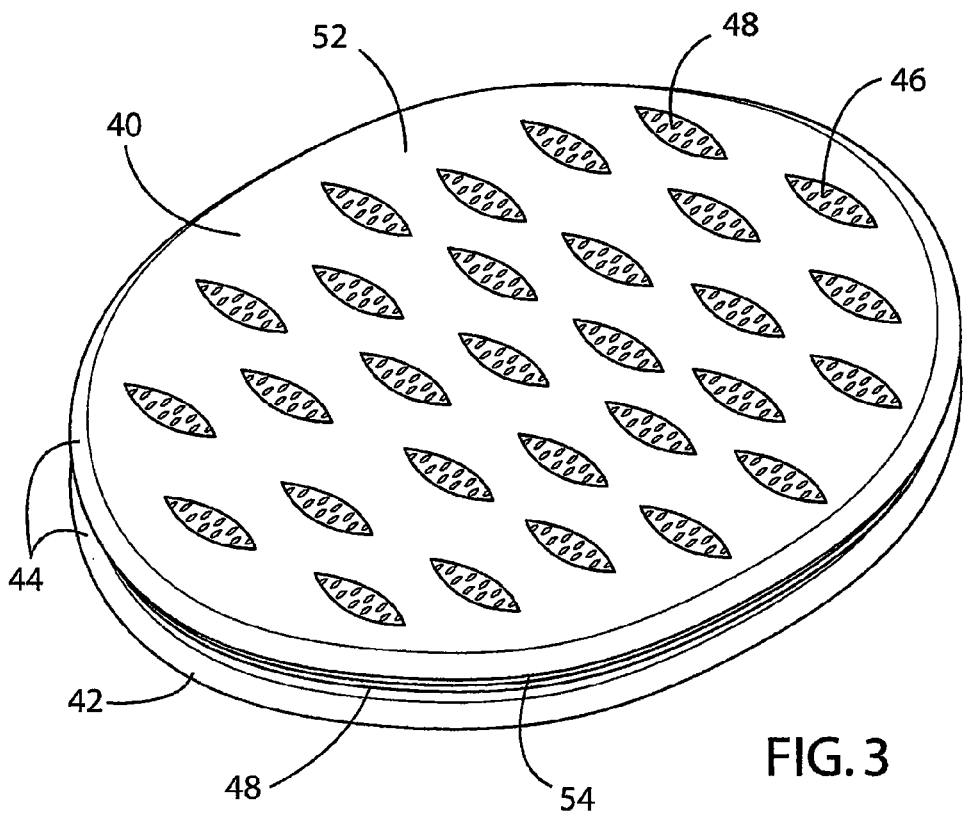
FIG. 3 is a perspective view of another exemplary embodiment of the present double-crusted pizza product.

An exemplary double-crusted pizza product and a process for producing the same are provided having a peripheral gap, or a substantial peripheral gap, around the edge of product between upper and lower crusts, without compromising its structural integrity. The double-crusted pizza is specifically configured to enable consumers to view a portion of the ingredients located between substantially equal and parallel upper and lower crusts, providing a pleasantly "filled" appearance to consumers. According to one embodiment, a product includes upper and lower sauce layers adjacent to the inner surfaces of each corresponding crusts to facilitate adhesion to each other and the ingredients, and to restrict the crusts and ingredients located there between from shifting.

In general, a lower sauce layer can be applied to an upper surface of the lower crust. At least one ingredient can be deposited on the lower sauce layer. A second sauce layer can be applied above the at least one ingredient. The upper crust is placed above, and in contact with, the upper sauce layer. A gap can be left around the crust edges between the upper and lower crusts in its entirety or optionally, at least substantially around the crust edges. Optionally, one or more additional ingredients can be applied to an upper surface of the upper crust. The double-crusted pizza product can then be frozen, packaged and distributed ultimately to consumers.

Turning now to the Figures, an embodiment of a pizza product generally indicated at 10 in FIGS. 1 and 2 includes substantially similarly shaped upper crust 12 and lower crust 14 oriented substantially parallel, which are spaced apart to define a gap 16. A first sauce layer 18 can be applied to an upper surface 20 of lower crust 14. Alternatively, in lieu of a first sauce layer, there can be an oil layer applied, using food grade oils, such as olive, corn, soy, vegetable oil. One or more ingredients 22 can be dispersed over the first sauce layer. In one approach, a second sauce layer 24 can be applied over the layer of one or more ingredients 22, adjacent to a lower surface of the upper crust 12. Optionally, additional ingredients 28 (described below) can be provided on an upper surface 26 of upper crust 12. So configured, the gap between the upper and lower crusts 12 and 14 may be sufficiently large to facilitate viewing of the sauce layers 18 and the one or more ingredients 22. The double-crusted pizza product 10 can be either refrigerated or frozen and distributed to restaurants or grocery stores for consumers to purchase, bake and consume.

Upper and lower crusts 12 and 14, can be formed of any type of dough typically used to form pizza crust. In one approach, the crust includes a partially baked ("par-baked") pizza dough. In another approach, the dough can be in the form of a raw, self-rising dough, which will rise upon baking. Preferably, upper and lower crusts 12 and 14 have substantially similar dimensions, so that when upper crust 12 is positioned above the lower crust 14, they overlap and have substantially parallel peripheral edges 20. Cut-outs 8 of varying shapes, sizes and quantities can also be provided on upper crust Although upper and lower crusts 12 and 14 are illustrated in round (FIG. 3) or rectilinear (FIG. 1) shapes, it is noted that the crust shape can be embodied in any variety of shapes. In one approach as found in FIG. 1, the crusts can be about 28 by 28 cms. As illustrated in FIG. 3, upper and lower crusts 40 and 42 can be circular, with substantially overlapping edges 44. In this form, the crusts can have diameters of approximately 15-30 cms, or more preferably about 28 cms. The upper and lower crusts 40 and 42 can have similar or different thicknesses ranging from about 12 mms to about 36 mms. In another approach, the thickness of each of the upper and lower crusts may be approximately 2.5 cms.

In another approach, illustrated in FIG. 3, one or more openings 46 can be formed through upper crust 40 to facilitate additional or alternate viewing of upper layer of ingredients 48 located thereunder. According to one example, a plurality of oblong openings 46 can be formed through the upper crust 40. In another approach (not shown), a single circular opening can be formed through the center of the upper crust 40. It will be appreciated that the upper crust 40 may include any number or shape of openings extending through its upper surface 52 to its lower surface 54.

Reverting back to FIGS. 1 and 2, a first sauce layer 18 can be applied directly adjacent to the upper surface 20 of the lower crust 14. Alternatively, in lieu of a first sauce layer, there can be an oil layer applied, using food grade oils such as olive, corn, soy, vegetable oil. First sauce layer 18 preferably can be a sauce in the range of about 0 to 70 percent water by weight, and preferably about 50 percent water by weight or less. Other than providing desirable flavor and organoleptics to double-crusted pizza product 10, first sauce layer 18 can also provide a medium for adhesion of ingredients 22 within product 10. Absence of first sauce layer 18 can cause ingredients 22 to shift significantly during packaging and transportation of the packaged product.

The first sauce layer 18 additionally can act as an adhesive layer between the upper surface 20 of the lower crust 14 and the rest of the pizza product after freezing. The amount of sauce forming the first sauce layer may vary, but, when present, can generally be between about 28 to about 85 grams of tomato sauce, or more preferably between about 42 grams of tomato sauce (or additional flavor sauce) to about 71 grams of tomato sauce.

In a similar fashion, an additional second sauce layer 24 can preferably be applied over ingredients 22. Similar to first sauce layer 18, second sauce layer 24 acts as an adhesive layer between lower surface 32 of upper crust 12 and the rest of the product. Second sauce layer 24 preferably contains a relatively large concentration of water. Second sauce layer 24 preferably can be a high water concentration sauce in the range of about 40 to 100 percent water by weight, and preferably about 47 percent water by weight or higher. The amount of sauce in second sauce layer 24 may vary, but is generally between about 14 grams to about 60 grams of tomato sauce, or more preferably about 28 grams of tomato sauce.

In a frozen state, the high water concentration of second sauce layer 24 adhesively bonds with upper crust 12 and, when present, ingredients 22. Sauces with lower than described water concentrations, for example sauces with high oil concentrations, do not provide sufficient adhesive properties to sufficiently secure upper crust 12 to pizza product 10. Nevertheless, sauces with lower water content levels (such as about 0 to about 70 percent weight, and preferably about 50 percent weight or less) are sufficient to provide adhesion for first sauce layer 18 to lower crust 14 and may effectively secure the ingredients 22 to the remainder of pizza product 10. While first and second sauce layers 18 and 24 are described as tomato based marinara sauces herein, other sauces may be utilized such as barbeque sauces, pesto sauces, and the like. An advantage of the high water content of second sauce layer 24 is the ability to spray or shower the sauce onto upper crust 12 during assembly. Moreover, first and second sauce layers 18 and 24 can be different types of sauces.

Ingredients 22 can vary widely to consumer taste. Traditionally, cheese, such as mozzarella, is a key pizza ingredient. A cheese layer, such as cheese layer 34 in FIG. 2, is desirable not only for flavor and consumer expectations of a pizza product, but also that upon baking, melted cheese provides a further binding agent for other product ingredients.

Additional ingredients 22, other than cheese 34, can also be included in the product such as meats, additional cheeses, seasonings, vegetables, fruits, and the like. Traditional pizza combinations can include tomato based marinara sauce, mozzarella cheese, sausage, pepperoni, green peppers, and onions. In any event, ingredients 22 can be layered above first sauce layer 18, either above, below, or interspersed with the cheese 34.

As described above, the edges of the present pizza product 10 are specifically not connected around its entire periphery to form a pocket. As such, consumers may view ingredients 22 and sauce layers 18 and 24. In one embodiment, an average gap height 36, defined as the height between upper surface 20 of the lower crust 14 and lower surface 32 of upper crust 12 around the peripheral edges 30 thereof, can be between about 0 and 25 mms. In another approach, average gap height 36 can be between about 3 and 13 mms.

Figure 4:
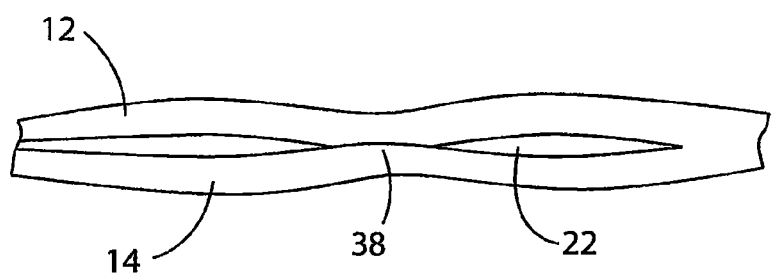
FIG. 4 is a side view of an exemplary embodiment of the present double-crusted pizza product showing partial touching of upper and lower crusts.

As illustrated in FIGS. 1 and 2, in one approach, gap 36 continuously extends around the entire periphery of the product. In another approach, such as shown in FIG. 4, portions of the peripheral edges of the upper and lower crusts 12 and 14 can have connecting points 38 where they touch. The percentage of crust that is connected or touching can be about 20 or 35 percent of the periphery of the product.

With the upper crust 12 positioned on product 10, additional ingredients 28 can be deposited on an upper surface 26 thereof (See FIG. 2). For example, oil, herbs, and additional cheese can be applied to provide additional desirable flavors, textures, and mouthfeel qualities to consumers. Additional ingredients 28 on upper crust 12 can include herbs such as oregano, basil, and rosemary, and common cheeses used as pizza toppings, such as parmesan, mozzarella or Romano cheeses.

A fully assembled pizza product 10 can be about 28 by 28 cms square, and have an overall height of approximately 32 mms. Gap 36 can be approximately 25 mms prior to baking, but in any event should be at least large enough to provide consumers with a partial view of ingredients 22 within the product. According to one approach, the overall weight of the pizza product 10 can be between about 500 and 800 grams.

The present product can be produced by a variety of methods for distribution to consumers. One such method can include initially providing a lower crust 14 to act as a base substrate onto which sauce 18, ingredients 22, and upper crust 12 can be deposited. Lower crust 14 can be par-baked (partially baked) prior to forming of the product or it may be a self-rising type raw dough that is not baked until a consumer prepares the product. Lower crust 14 can preferably be formed from about 195 to 210 grams of dough. In one approach, the dough is formed into a square shape. However, as described above, lower crust 14 can be formed into other shapes, for example circular, oval, or rectangular shapes.

A first sauce layer 18 can be applied to upper surface 20 of lower crust 14. According to one approach, about 55 to 85 grams of tomato based marinara sauce is applied with a water concentration as described above.

Next, additional ingredients 22 can be added on upper of first sauce layer 18. Additional ingredients 22 can be continuously deposited using a "waterfall" technique as it continuously advances down an assembly line. More particularly, in one approach, applying additional ingredients 22 can include depositing non-sliced meat on the pizza product using a first waterfall step. Next, a cheese waterfall can deposit from about 100 to 130 grams of shredded cheese onto the product above the meat layer. Next, about 28 to 57 grams of sliced meat can be applied above the shredded cheese layer. Finally, in one approach, vegetables can be applied using an additional waterfall as the pizza product passes therebelow.

After ingredients 22 have been deposited over first sauce layer 18, a sauce applicator can apply second sauce layer 24 above ingredients combination 22. The sauce applicator can apply sauce onto a passing pizza product, which can be about 28 grams. As described above, the high water content of second sauce layer allows the option of spraying the sauce onto the product.

Next, the pizza product can advance to a pre-melter. At the pre-melter, the product can be heated to a surface temperature of from about 26 to 55 degrees Celsius for about 5 to 15 seconds. During the pre-melter step, the cheese is partially melted to help maintain positioning of ingredients 22 within the pizza product during the remaining assembly and including shipping of the final product to consumers.

Next, an upper crust 12 can be applied to the product above second sauce layer 24. If cutouts 8 or 46 are provided in upper crust 12 or 40 respectively, the cutouts can be formed in an optional step prior to depositing the upper crust. When cutouts are provided, two methods are described below, wherein the cutouts are taken either before or after the billet step. In both cases, the dough is mixed, sheeted, and cut to form a billet. From this step, the product is proofed, optimally at a relative humidity in the range of about 40 to 60 percent (and preferably about 50 percent), at a temperature range of about 29 to 44 degrees Celsius (and preferably around 38 degrees Celsius), for about 15 to 30 minutes (and preferably around 18 to 20 minutes). Additionally, the upper crust can also be par-baked or be formed of raw self-rising dough. The upper crust may be formed prior to forming the pizza product herein, or simultaneously therewith.

Next, the billet can be pressed with an addition of mineral oil as a processing aid under the following hot press conditions: heat in the range of about 37 to 150 degrees Celsius, dwell for about 8 to 10 seconds, at a pressure of about 43 Kg/cm. Conditions of both upper and lower plate temperatures, dwell time and pressure settings can be altered and optimized per process to achieve desired final product dimensions. The product can then be par-baked and frozen for distribution or the product can go directly to the freezer and skip the par-baking step so it is distributed as raw dough.

Where cut-outs are desired, but not cut during the billet step, the cut-outs can be cut after the hot press step. Where the cut-out step occurs prior to the hot press, the cut-out can have an unevenly or "artisanal" shaped characteristic. The cut-out step after the hot press provides a more uniform shape to the cut-out since the cut-outs are formed after the product is pressed to its final dimensions. The choice of where to place the cut-out step is a matter of preference for the appearance of the final product.

Irrespective of when and how the upper crust is formed, it is preferably deposited onto the pizza product and configured such that the outer edges thereof are situated substantially parallel to the edges of the lower crust. The crust can be manually or mechanically placed on the product and can even be formed and cut just prior to assembly.

The pizza product can next advance down the assembly line to receive any optional additional ingredients 28. This can include passing under a second cheese waterfall. Typically, a smaller amount of cheese would be deposited above the upper crust than above the lower crust, such as about 55 grams.

Next, in one exemplary form, the product can be optionally advanced to a second pre-melter to partially melt the second layer of cheese applied by the second cheese waterfall to assist with adhesion of the second layer of cheese to the upper surface 16 of the upper crust 4. Further spices and the like can then be added as well.

Next, the formed pizza product can be advanced to a freezer, such as a spiral freezer, to freeze the pizza product prior to packaging. After freezing, the pizza product can be packaged and distributed to consumers. As mentioned above, the pizza product should stay frozen for the upper crust to adhere to the product through distribution and transportation.

Provided below are specific examples of pizza sauces according to the preferred embodiments.

TABLE 1

Pizza Sauce Example 1

| Ingredient | Amount (approx. % wt) |
|---|---|
| Tomato Paste (31% solids) | 50 |
| Water | 47 |
| Oil | 1 |
| Spice | 2 |

TABLE 2

Pizza Sauce Example 2

| Ingredient | Amount (approx. % wt) |
|---|---|
| Milk | 32 |
| Palm Oil | 29 |
| Water | 21 |
| Cream Cheese | 10 |
| flavor | 2 |
| modified cellulose | 1.5 |
| food starch - modified | 1.5 |
| Sodium Stearoyl Lactylate | 1 |
| Mono and Diglycerides (emulsifier) | 1 |
| Sugar | 0.5 |
| Citric Acid | 0.5 |

The pizza sauce of Example 2 exhibited sufficient binding characteristics to maintain the ingredients within the product. Example 2 sauce did not sufficiently adhere the upper crust to the remainder of the pizza product upon freezing. Hence, Example 2 is better suited as a first sauce layer. Example 1 sauce, with its increased water content, is suited for either a first sauce layer or the upper second sauce layer.

It will be understood that various changes in the details, materials, and arrangements of the process, formulations, and ingredients thereof, which have been herein described and illustrated in order to explain the nature of the method and resulting product, may be made by those skilled in the art within the principle and scope of the embodied method as expressed in the appended claims.

We claim:

1. A double-crusted layer pizza product, comprising:
   a lower crust layer forming a base, the lower crust layer having an inner surface;
   an upper crust layer positioned above the lower crust layer, the upper crust layer having a inner surface, at least a portion of the inner surfaces of the lower crust layer and the upper crust layer spaced from one another defining a gap therebetween that continuously extends along the peripheral edges of the upper and lower crust layers around the entire periphery of the product;
   a first sauce layer directly adjacent to the inner surface of the lower crust layer and positioned between the lower and upper crust layers, the first sauce layer having a water concentration of about 50 percent weight or less;
   a second sauce layer directly adjacent to the inner surface of the upper crust layer and positioned between the lower and upper crust layers, the second sauce layer having a water concentration of at least about 47 percent weight; and
   at least one ingredient positioned at least partially between the first sauce layer and the second sauce layer.

2. The double-crusted pizza product of claim 1, wherein the upper crust layer and the lower crust layer are substantially parallel to each other.

3. The double-crusted pizza product of claim 1, wherein the upper crust layer has substantially the same dimensions as the lower crust layer.

4. The double-crusted pizza product of claim 1 wherein the average height of the gap is up to about 24 mm.

5. The double-crusted pizza product of claim 1, further comprising at least one cutout on the upper crust.

6. A method of forming a double layer pizza product, comprising the steps of:
   providing a lower crust layer to form a base of the pizza product;
   applying a first sauce layer on an upper surface of the lower crust layer, the first sauce layer having a water concentration of about 50 percent weight or less;
   distributing at least one first ingredient on the first sauce layer;
   applying a second sauce layer over the at least one first ingredient layer, the second sauce layer having a water concentration of at least 40 percent weight; and
   providing an upper crust layer above and adjacent to the second sauce layer so that at least a portion of a peripheral edge of the upper crust is spaced from an adjacent portion of a peripheral edge of the lower crust layer to define a gap therebetween that continuously extends along the peripheral edges of the upper and lower crust layers around the entire periphery of the product.

7. The method of claim 6, wherein the steps of providing the crust layers comprises the steps of:
   mixing, sheeting and cutting dough to form a billet; and
   hot pressing the billet at about 37 to 150 degrees Celsius, with a dwell time of about 8 to 10 seconds, at a pressure of about 43 Kg/cm.

8. The method of claim 7, further comprising the step of providing a cut-out of the upper crust layer.

9. The method of claim 8, wherein the step of providing the cut-out occurs prior to the step of hot-pressing the billet.

10. The method of claim 9, wherein the step of providing the cut-out occurs after the step of hot-pressing.

11. The method of claim 6, wherein the step of applying a second sauce layer comprises the step of spraying the second sauce layer.

12. The double-crusted pizza product of claim 1, wherein the first sauce layer comprises tomato sauce in an amount between about 42 grams and about 71 grams, and the second sauce layer comprises tomato sauce in an amount between about 14 grams and about 60 grams.

13. The double-crusted pizza product of claim 1, wherein the average height of the gap is between 3 and 13 mm.

* * * * *